United States Patent [19]
Driessen et al.

[11] 3,946,657
[45] Mar. 30, 1976

[54] PROCESS FOR THE CONTINUOUS PREPARATION OF YOGURT AND OTHER FERMENTED MILK PRODUCTS

[75] Inventors: Fransiscus M. Driessen, Ede; Jacobus J. Stadhouders, Bennekom; Jacob Ubbels, Ede, all of Netherlands

[73] Assignee: Stiching Bedrijven Van Het Nederlands Instituut Voor Zuivelonderzoek, Ede, Netherlands

[22] Filed: Aug. 6, 1974

[21] Appl. No.: 495,276

Related U.S. Application Data
[62] Division of Ser. No. 349,196, April 9, 1973.

[30] Foreign Application Priority Data
Apr. 7, 1972 Netherlands......................... 7204690

[52] U.S. Cl. .................... 99/455; 99/461; 99/466
[51] Int. Cl.² ............................................. A23C 3/04
[58] Field of Search ............. 99/452, 348, 453–454, 99/455–456, 457–458, 459–460, 461–462, 463–464, 465–466, 473, 483, 485; 259/7, 8; 426/34, 36, 42–43, 61, 519

[56] References Cited
UNITED STATES PATENTS

| | | | |
|---|---|---|---|
| 1,819,023 | 8/1931 | Grindrod | 99/483 X |
| 2,387,276 | 10/1945 | Link | 99/456 X |
| 2,592,224 | 4/1952 | Wilson et al. | 99/452 X |
| 2,908,575 | 10/1959 | Spiess et al. | 426/36 |
| 3,079,263 | 2/1963 | Foster et al. | 99/452 X |
| 3,210,845 | 10/1965 | Radema et al. | 99/460 X |
| 3,599,938 | 8/1971 | Anders et al. | 259/7 |
| 3,703,435 | 11/1972 | Schleinofer | 259/8 X |

*Primary Examiner*—Robert L. Bleutge
*Assistant Examiner*—Arthur O. Henderson
*Attorney, Agent, or Firm*—Fleit & Jacobson

[57] ABSTRACT

Yogurt and other fermented milk products are prepared in a continuous process in which a continuous stream of milk is added to a fermenting mixture of milk and a starter in a prefermenting tank. The pH of the mixture in the prefermenting tank is maintained above the value at which stirring of the mixture will cause syneresis to occur in the final product. A portion of the prefermented mixture is passed into a coagulating tank in which further fermentation and coagulation can take place. In the coagulating tank, the mixture, when its pH surpasses the acidity at which stirring will no longer cause syneresis, is subjected to shearing forces and thereafter filled into containers to produce the final product.

18 Claims, 5 Drawing Figures

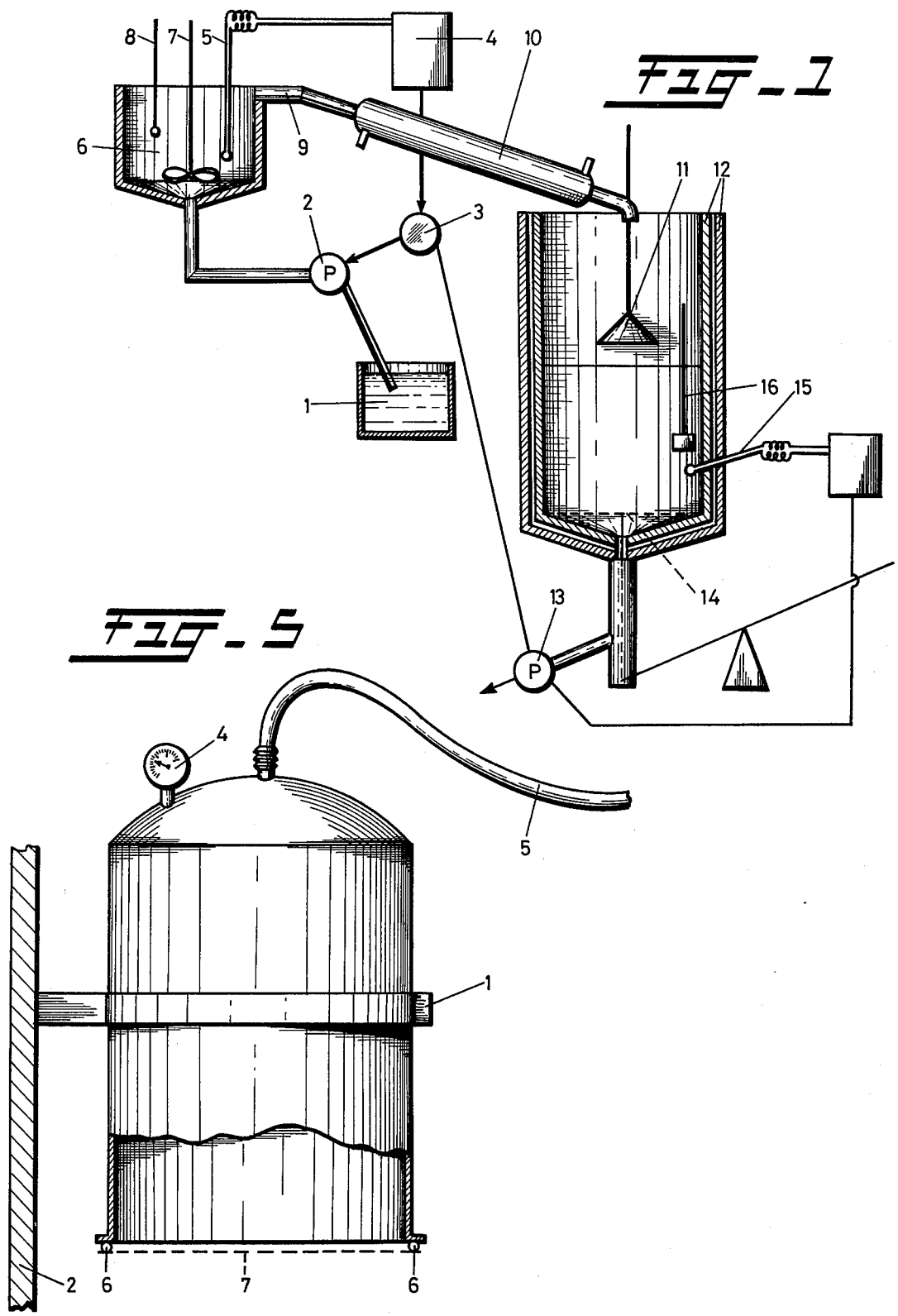
Fig_1
Fig_5

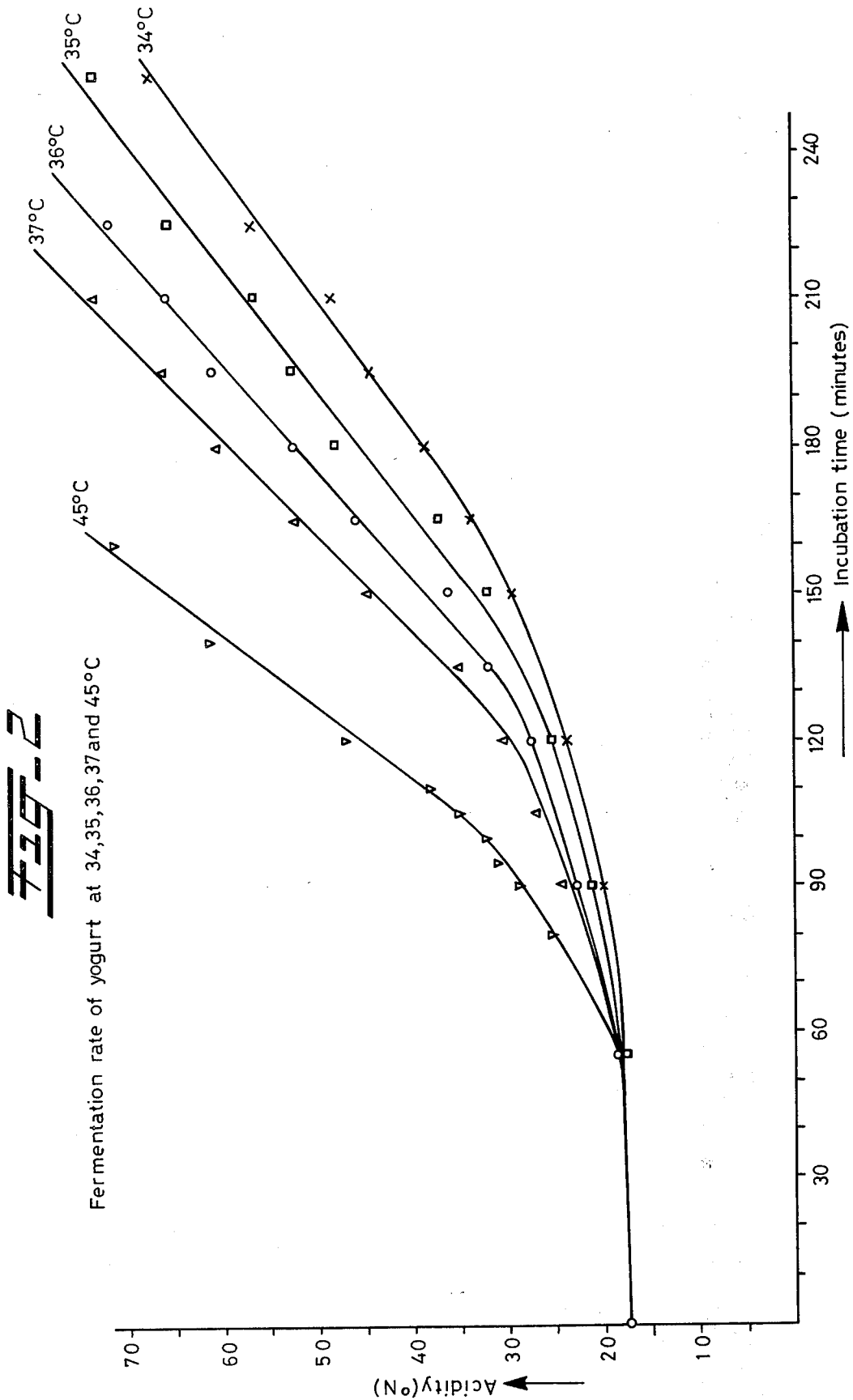

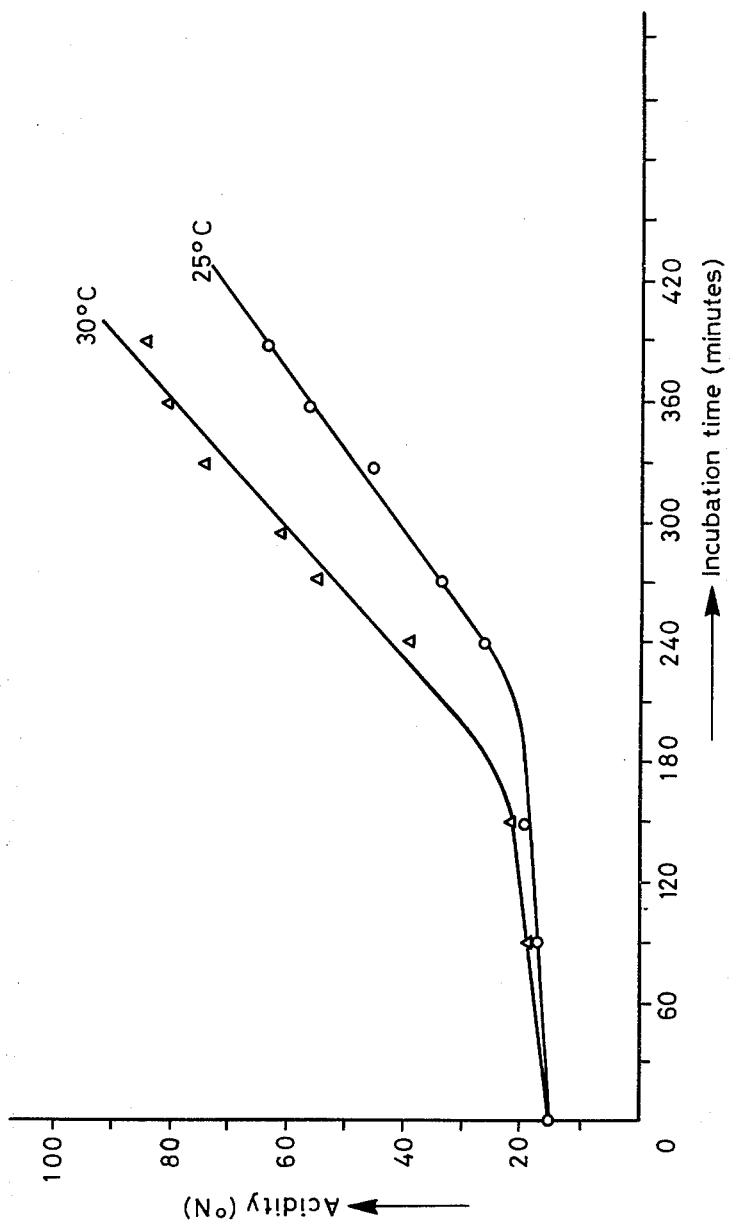

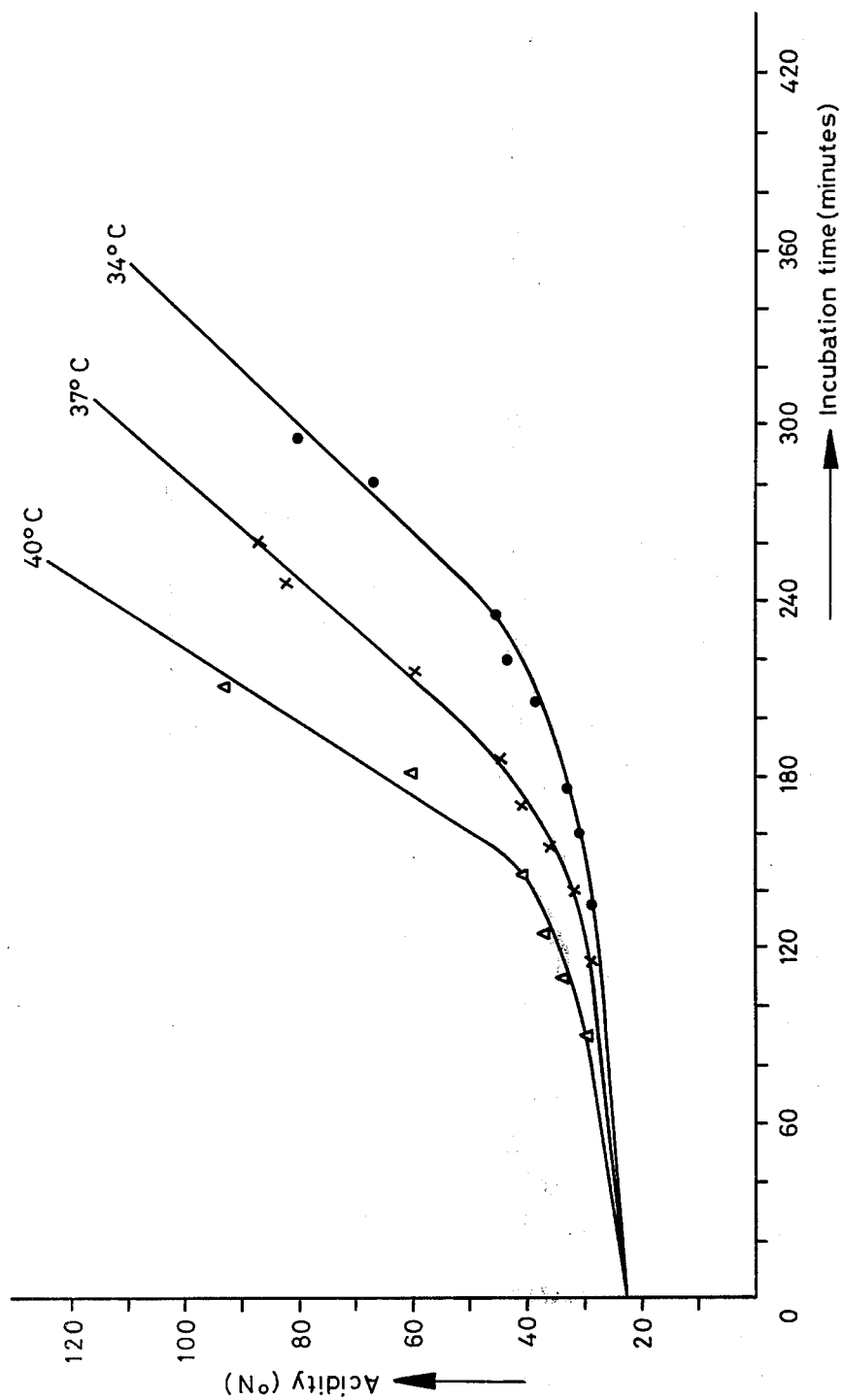

PROCESS FOR THE CONTINUOUS PREPARATION OF YOGURT AND OTHER FERMENTED MILK PRODUCTS

This is a division of application Ser. No. 349,196 filed Apr. 9, 1973.

The present invention relates to a process for the continuous preparation of yogurt and Bulgarian yogurt by adding a continuous stream of milk to a fermenting mixture of milk and a starter in a pre-fermenting tank, while maintaining the temperature at 42°–48° C and the pH above 5, 6, passing a similar quantity of the fermenting product into a coagulating tank, in which the further fermentation and coagulating can take place.

The present invention relates also to a process for the continuous preparation of cultured buttermilk and lactic starters by adding a continuous stream of milk to a fermenting mixture of milk and a starter in a prefermenting tank, while maintaining the temperature at 20°–35° C and the pH above 5.3, passing a similar quantity of the fermenting product into a coagulating tank in which the further fermentation and coagulation can take place.

Such a semi-continuous process is known from the publication of Girginov's article in "Die Lebensmittelindustrie", 12, 263(1965), whereby 1–3% by weight of a fresh uncooled culture of *Lactobacillus bulgaricus* and *Streptococcus thermophilus* having an acidity of 30°–32°SH (~80°N) is added to pasteurized and homogenized milk, after which the mixture is allowed to ferment at a temperature of 46°–48°C until an acidity is reached of approximately 30°N; subsequently the continuous pre-fermentation process starts, during which the quantities of pasteurized, non-fermented milk having a temperature of 46°–48°C added thereto are equal to the quantities of fermented product simultaneously discharged, and whereby the acidity of 9.5°–12°SH (~30°N) and the level of liquid in the tank are maintained. The partly fermented milk is then cooled to a temperature of 32°–33°C and packed in containers, in which further fermentation takes place at the same temperature until the desired acidity is reached. Finally, the product is cooled to a temperature of 5°–6°C. Girginov's process is a semicontinuous process.

It was found now that yogurt may be prepared in a continuous process by allowing the fermenting mixture to pass in the form of a plug stream through a coagulating tank, which is provided with a discharge pipe at the bottom side, whereby the gel structure of that part of the plug stream which has a pH not exceeding 4.7 and a temperature of from 33° to 37° C, is disturbed by subjecting it to shearing forces, and subsequently filling containers with the product prepared.

Further it was found, now, that Bulgarian yogurt may be prepared in a continuous process by allowing the fermenting mixture to pass in the form of a plug stream though a coagulating tank, which is provided with a discharge pipe at the bottom side, whereby the gel structure of that part of the plug stream, which has a pH not exceeding 5.1 and a temperature of from 33° to 37° C, is disturbed by subjecting it to shearing forces, and subsequently filling containers with the product prepared.

Likewise, it was found now that cultured buttermilk and lactic starter may be prepared in a continuous process by allowing the fermenting mixture to pass in the form of a plug stream through a coagulating tank, which is provided with a discharge pipe at the bottom side, whereby the gel structure of that part of the plug stream, which has a pH not exceeding 4.7, is disturbed by subjecting it to shearing forces, and subsequently filling containers with the product prepared.

Preferably a coagulating tank is used, the wall of which is subjected to a pre-treatment; for example, a pre-treatment of a stainless steel tank with a lecithin emulsion, lecithin, or similar surface active substances. The use of PTFE is also efficient.

The fermenting mixture should be passed through a coagulating tank in the form of a plug stream because the structure of the product would be detrimentally affected if deliberately produced turbulences, or unintentionally generated turbulences, should occur in such a mixture, causing a.o. syneresis to occur. In this connection it is desirable to cool the pre-fermented milk to a temperature of from 31° to 37°C (see Th.E.Galesloot, Off.Org. FNZ 47,720 (1955)) because in said temperature range sufficient quantities of macilageous substances are formed to provide a yogurt having after stirring a sufficient viscosity and moreover than the syneresis will be less pronounced than on omitting the cooling of the pre-fermented milk. If the fermenting milk has obtained a sufficient acidity, i.e. if the acidity reached is between 70° and 100°N, stirring may be continued without causing permanent damage to the structure and/or whey separation. It is to be understood that the final acidity is also determined by the protein content of the milk.

It is preferable to enable the plug stream to be formed by spraying the prefermented mixture into a coagulating tank, the walls of which are coated with a surface active compound. For practical reasons it is of importance that the plug stream in the coagulating tank is passed at a rate of speed of at most 5 cm/minute at a temperature of 37°C.

In order to obtain a product which is as homogeneous as is possible, it is desirable to hold the temperature at which the fermenting mixture is passed into the coagulating tank at a constant value. Although the viscosity of the homogeneous product obtained by disturbing the gel structure of yogurt by stirring is not very critical, it is preferable to disturb the gel structure no longer than is necessary for the viscosity of the homogeneous product (measured according to G. Posthumus Off.Org. FNZ 46,55 (1954)), 20–40 seconds. Preferably the fermented product is cooled to a temperature of from 5° to 6°C between the coagulating tank and the filling apparatus.

Whereas it is obviously desirable, preceding to the filling operation, to disturb in the lower part of the coagulating tank the structure of the fermented milk, changing it from a firm gel into a smooth highly-viscous fluid, it should be prevented by all means that the structure of the fermented milk is disturbed at an upstream level at which the pH has not yet decreased to the extent that a disturbance will not cause ultimately a serum expulsion. To this end, for example, a plate having the dimensions of a plane cross-section of the tank, and adapted to be moved parallel to the axis of said tank, may be provided with a number of perforations distributed across the surface and may be lowered following the movement of the fermenting milk at substantially the same rate of speed, in the same direction over some distance, to be subsequently moved in the opposite direction at a much faster speed, over a distance that is not so great as to cause the plate to reach that part of the tank in which fermentations has not yet proceeded to a sufficient extent to allow stirring without any permanent adverse effects on the structure. An alternative way of stirring may consist in that the plug stream on its slow passage downstream of the zone where a sufficient acidity has been reached to allow stirring without any permanent adverse effects on the structure is temporarily interrupted by a partition plate, for example, by pushing through a plate which is provided with an aperture having the same shape as the cross-section of the tank, after which the structure of the fermented milk under said plate can be disturbed by stirring. If the plate is returned to its original position, after the stirring process has been stopped, the plug stream can resume its slow passage, so that the stirred, fermented milk is pressed out of the tank. Other methods for stirring the fermented milk in the tank without disturbing the structure of the upstream milk fall also under the protective scope of the process according to the present invention.

The moment at which the structure in the column can be distrubed according to any one of these methods can be controlled by a measuring of the pH in the fermenting milk.

A continuous process for the fermentation of milk products according to the present invention can simply be controlled by means of remote control, which leads to a uniform final acidity. The viscosity of the filled product may be affected by disturbing the structure to a greater or lesser extent, e.g. by stirring in a less intensive manner or by displacing the perforated plate against the direction of the flow of milk at a different rate of speed. Furthermore the required daily output can be spread out over a longer period of time, making it possible for the bottled product to be holder pasteurized in a simple manner as filling occurs at a low speed. The keeping qualities can thus be improved to a considerable extent. In addition to this it becomes very much simpler to apply the aseptic method owing to the low bottling speed and owing to the fact that the preparation of the product takes place in a closed apparatus.

The present invention may be more readily understood by reference to the following drawings wherein:

FIG. 1 is a view partly in cross section and partly schematic of the apparatus used to carry out the inventive process;

FIG. 2 is a graph illustrating the fermentation rate of yogurt as a function of temperature;

FIG. 3 is a graph similar to FIG. 2 illustrating the fermentation rate of cultured buttermilk as a function of temperature;

FIG. 4 is a graph similar to FIGS. 2 and 3 illustrating the fermentation rate of Bulgarian yogurt as a function of temperature; and FIG. 5 is a view of an apparatus used in accordance with the present invention for determining conditions of use for different perforated plates in the coagulating tank of the inventive apparatus of FIG. 1.

The process of the present invention can be carried out with the aid of an apparatus, which is diagrammatically shown in FIG. 1. Storage tank 1 is connected with preferimenting tank 6 by means of a pipeline through pump 2. Pump 2 is activated by a switch 3 which in its turn is controlled by a signal from the pH meter 4. Tank 6 is equipped with an overflow 9 for the discharge of pre-fermented product, a stirrer 7 and a temperature sensor 8, a pH sensor 5 and, for example, a device for spraying hot water against the wall of the tank. Overflow 9 is directly connected with cooler 10, which ends in a distributing device 11 at the top portion of coagulating tank 12.

The coagulating tank 12 is preferably constructed with double walls, while it is provided with a device to hold the temperature of the contents at a constant value. The distributing device 11 may, for instance, comprise a conical disc which is rotating at high speed and with which the pre-fermented product which flows from cooler 10 onto said disc is atomized.

At the lower side of the coagulating tank 12 is mounted a discharge pipe which is connected with a pump 13 with which the final product is pumped to a filling apparatus. Said pump 13 can be controlled by the switch 3, provided its capacity is equal to that of pump 2. Otherwise it is possible to use a similar control as is used to activate the pump 13 if the pH at the bottom of the vat 12 has reached a predetermined value, whereby the capacity of pump 13 should be somewhat larger than that of pump 2, or should be equal thereto.

In carrying out the process in the apparatus described above, the wall of the coagulating tank 12 is preferably pretreated with a surface active compound. For this purpose lecithin, a lecithin emulsion, a Teepol solution, or any other surface active substance can be used, for instance, for a stainless steel wall (see. A. G. J. Arentzen, Off.Org. FNZ 58,479 (1966)). The wall may also be coated with polytetrafluoroethylene.

The storage tank contains, if required homogenized and standardized, pasteurized or sterilized milk. Said milk, in dependency on the product to be prepared, has a temperature of from 42° to 48°C, where yogurt is concerned, and a temperature of from 20° to 35°C where starters or cultured buttermilk are to be prepared. The milk is pumped into the prefermenting tank 6, after which 1–3% by volume of the fermentation culture is added thereto.

As soon as the milk in said tank has reached a stage in the fermentation process in which the pH value is 5.3 to 5.8 in dependency on the fermentation temperature, the pump 2 is acitivated by means of the pH meter 4 and the switch 3. This arranges for milk to be pumped into the pre-fermenting tank, while a similar quantity of the pre-fermented milk passes through the overflow 9 and the cooler 10 to the distributing device 11 in the upright coagulating tank 12. If owing to this inflow of unfermented milk, the pH reaches a value which is, for instance, 0.1 of a pH unit higher than the adjusted pH value, the pump 2 is switched off again.

The pre-fermented milk can be cooled from the fermentation temperature to a temperature of from 33° to 37°C by means of the cooler 10. This is to be recommended if yogurt is prepared, but not if starters or cultured buttermilk and similar products are prepared.

Before the final product is removed by pumping first of all the structure of the same is stirred into a smooth consistency. This is only carried out in the bottom part of the coagulating tank wherein the acidity reached is already sufficiently high to avoid any permanent adverse effects on the structure, while it has to be prevented that the structure upstream of said part is also disturbed. To this end the vat has been equipped with an appropriate stirring means, for instance the means 14. Preferably said means comprises a movable plate which is provided with perforations uniformly spaced over its entire surface, the area of those perforations amounting to at most 20% of the total area of the plate.

To start the process the space under the stirring means 14 is filled with stirred final product. The distributing device is thereupon lowered to just above the stirring means 14. Subsequently the pre-fermented product is allowed to start filling the coagulating tank 12, which product flows from the pre-fermenting tank 6. During the filling process the distributing device 11 is gradually moved in an upward direction, so that under all conditions pre-fermented milk is sprayed over the surface of the milk in the coagulating tank 12.

During the process of filling of the coagulating tank 12 pump 13 remains inactivated. The moment at which the discharge of the final product can be started with the aid of said pump is, for instance, determined with a pH sensor which is mounted through the wall of the coagulating tank 12 in a zone which is just above the part with the fermenting milk, the structure of which is to be disturbed just before the filling or bottling process. An alternative possibility is to arrange that the activation of the pump 13 is controlled by the pH sensor 15 in conjunction with the device appropriate to the purpose. A similar control is also possible by means of a level sensor 16. Another possibility is to determine the moment at which the correct acidity or pH is reached in a sample of the pre-fermented milk, which is taken when the first quantity of pre-fermented milk is passed into the coagulating tank and maintained at the temperature of fermentation. Finally, it is possible to start the pump at a predetermined time to be counted from the moment when filling of the coagulating tank was started, provided the prefermenting rate in the fermenting tank has not shown any deviations from the usual rate.

The content of the apparatus depends of course on the required hourly capacity. However, a predetermined ratio between the content of the prefermenting tank 6 and of the coagulating tank 12 is inoperative, which ratio can be deduced from the fermentation rates at the temperature prevailing in each of said tanks. The connection between the reached acidity and the incubation period for a yogurt culture is shown in FIG. 2. The following fermentation rates were determined for the linear part of the curves found, by applying the method of the least squares; at a temperature of

| | | | | | | |
|---|---|---|---|---|---|---|
| 45°C | : | a | = | 0.67 | t − | 32.17 |
| 37°C | : | a | = | 0.50 | t − | 31.17 |
| 36°C | : | a | = | 0.45 | t − | 29.86 |
| 35°C | : | a | = | 0.40 | t − | 26.71 |
| 34°C | : | a | = | 0.38 | t − | 29.56 | in which "$t$" stands for the incubation period in minutes and "$a$" stands for acidity in °N reached after said period.

The curves of FIG. 3 were found for a lactic starter culture or cultured buttermilk culture and from these were determined the following fermentation rates; at a temperature of

| | | | | | | |
|---|---|---|---|---|---|---|
| 30°C | : | a | = | 0.34 | t − | 37.49 |
| 25°C | : | a | = | 0.29 | t − | 43.66 |

The curves found in FIG. 4 are those found for Bulgarian yogurt and the fermentation rate found at a temperature of

| | | | | | | |
|---|---|---|---|---|---|---|
| 45°C | : | a | = | 1.14 | t − | 80.00 |

-continued

| | | | | | | |
|---|---|---|---|---|---|---|
| 40°C | : | a | = | 0.79 | t − | 76.71 |
| 37°C | : | a | = | 0.59 | t − | 64.04 |
| 34°C | : | a | = | 0.56 | t − | 87.66 |

The existing connection between acidity and pH in the various cultures depends on the protein content thereof. Examples are given in the tables A, B and C. In these tables is also stated in which pH range the culture cannot be agitated without causing permanent damage to the structure.

The dimensions of the apparatus for a desired capacity of the same can be determined from the aforementioned data. An example thereof will be given hereinafter. If it is desired per hour to ferment 500 l of yogurt of 80°N at a temperature of 45°C, starting from milk having an acidity of 15°N, while drawing off will occur at an acidity of 32°N, at which the yogurt will be passed into a coagulating tank, the flow rate in the fermenting tank will be determined by assuming that the rise in acidity by the proceeding fermentation process $$\left(\frac{\delta a}{\delta t}\right)$$

fermentation in a given period of time δt is compensated owing to a similar reduction in acidity in the same period of time by the addition of non-fermented milk $$\left(\frac{\delta a}{\delta t}\right)$$

addition. Thus $$\left(\frac{\delta a}{\delta t}\right)_{fermentation} = 0.67 = -\left(\frac{\delta a}{\delta t}\right)_{addition} = \frac{15 - 32}{t},$$

from which it follows that the average residence time of the milk in the fermenting tank $t = 25.4$ minutes.

In an hour's time the content of the tank are thus $$\frac{60}{25.4} = 2.36$$

times changed and for an hourly capacity of 500 l the tank should thus have a capacity of $$\frac{500}{2.36} = 212 \text{ l.}$$

If the fermentation process is continued in the coagulating tank at a temperature of 37°C, the residence time $t$ of the milk in said tank may be calculated from $$0.50 \ t = 80 - 32 \text{ or } t = \frac{48}{0.50} = 96 \text{ minutes,}$$

if the acidity of 32°N should increase to 80°N.
The capacity of the tank is thus $$\frac{96}{60} \times 500 = 800 \text{ l.}$$

It is not desirable to increase the cross-section of the tank too much. In order to damage the structure prior to drawing off the final product the stirring means 14 has to be raised at a rapid rate of speed. The force required thereto increases in proportion to the area of said stirring means. On the other hand the area must not be made too small, as this would result in the height of the coagulating tank increasing to a disproportionate extent. Apart from possible difficulties arising from mounting a very high tank, this causes the rate of speed at which the fermenting milk flows along the wall of the tank to become too fast. It has been determined at various temperatures to which extent the structure of the fermenting milk was permanently damaged if the said milk was made to flow along a stainless steel wall of the tank, treated with lecithin, at a rate of speed of 5 cm/minute. Some results have been given in table D, from which it appears that at a temperature at which on the one hand the formation of mucilage is sufficiently large (<38°C) and on the other hand the fermentation rate is not too low (>33°C) a rate of not over 5 cm/minute with respect to the wall is just permissible. In the example given the milk, at a temperature of 37°C, may be displaced along the wall over a distance of at most 480 cm in 96 minutes. This entails that the diameter of the tank should be at least $$\sqrt{\frac{600.000}{480 \times 3.14}} = 23 \text{ cm.}$$

A tank constructed with a height of two to four metre is preferably used.

The stirring means 14 can, for instance, consist of a flat plate which fits closely in the coagulating tank by means of a sealing ring and is adapted to be moved in an upward and downward direction so that it moves parallel to the axial direction of said tank. The downward movement should be performed at substantially the same speed at which the fermenting milk passes along the wall of the container. During the upward movement the structure of the final product has to be disturbed and for this purpose the plate has to be moved at a far greater speed. During this movement the product is forced to pass through a number of perforations provided in the plate with the result that there is obtained a smooth structure, while the viscosity does not decrease to too great an extent. The rate at which such a plate has to be raised in order to obtain a smooth structure is determined by the diameter of the perforations and their number per unit area. The rate must not be too great, as in that instance the viscosity of the yogurt is reduced too much, but the rate has to be sufficiently great to obtain a smooth structure.

2 litre of yogurt were prepared in a cylindrical tank having a diameter of 12.5 cm and, diagrammatically shown in FIG. 5, at a temperature of 37°C. In the FIG. 1 stands for the fermenting tank, 2 stands for a support from which the tank 1 is suspended by means of clamping means 3, 4 stands for a manometer, 5 stands for a pipeline through which nitrogen is pressed into said tank, 6 stands for a sealing ring, 7 stands for the stirring plate to be tested. After having reached an acidity of 80°N the yogurt, with nitrogen of a pressure known as such, was pressed through the perforated plate in a given period of time. The viscosity of the yogurt flown out of the tank was measured and the structure thereof was examined. The results thus obtained are given in Table E. Five different plates $a$, $b$, $c$, $d$ and $e$ were used for this test. The plates $a$, $b$ and $c$ were constructed with perforations having a diameter of 1.0, 0.36 and 0.25 cm respectively. Plate a had been constructed with one perforation only. The number of perforations for the plates $b$ and $c$ were defined by calculation, so that with a uniform outflow capacity the average shearing rate in each perforation of the three plates would be the same. Perforations having a sectional size of 0.15 cm were provided in the plate $d$ in the same points as in plate $c$. In these perforations the average shearing rate is thus greater than in the plates $a$, $b$ and $c$, while processing conditions were the same. The perforations were provided such that they were uniformly spaced across the surface of each plate. Perforations having a sectional size of 0.25 cm are provided in the plate e such that they are uniformly spaced at the angles of equilateral triangles having a side of 0.75 cm. 10% of the surface of said plate approximately is open as a result thereof. The following directives are true for the calculations:

$$\frac{\dfrac{V}{v_i} \cdot \dfrac{1}{t}}{d_i} = \frac{\dfrac{\pi}{4} d_i^2 n_i}{d_i} = c \gamma = C$$

Herein is $V$ : the volume of the yogurt in the tank (2000 cm³).

$t$ : the outflow time of said yogurt through the plate (4s)

$d_i$ : the diameter of the perforations in the plate (for the plate a $d_a = 1.00$ cm)

$n_i$ : the number of perforations in the plate (for plate a $n_a = 1$)

$\overline{v_i}$ : the average rate of speed of the outflowing yogurt through each of the perforations in the plate (for plate a $$\overline{V}_a = \frac{V}{t \cdot \frac{\pi}{4} \cdot d^2} = \frac{2000}{3.14} = 637 \text{ cm } s^{-1})$$

$\gamma$ : the average shearing rate $(s^{-1})$ $c$ : a constant value.

From the data for plate a it can be calculated that $C = 637$. With this value as base it follows for the plates $b$ and $c$ and $n_b = 22$ for $d_b = 0.36$ cm, and $n_c = 62$ for $d_c = 0.25$ cm, if $(V/t) = 500$ cm³/s remains constant.

From the data of Table E it appears that with a similar average shearing rate $\gamma$ the viscosity still varies with the plates $a$, $b$ and $c$. This may partly be attributed to the fact that as a result of the varying number of perforations per unit area in the three stirring plates, the displacement of the yogurt over said plates is accompanied with a variation in shearing rate.

The process will now be explained in more detail with reference to a number of examples.

EXAMPLE I.

Standardized (2.95% fat), homogenized (150 atm. at 55°C), and pasteurized (5 minutes at 85°C) milk having a temperature of 45°C was introduced in a pre-fermenting tank having a content of 12 l until the tank was nearly completely filled. To this milk was subsequently added ½ l of a yogurt culture consisting of *S. thermophilus* and *L. bulgaricus*. The stirring device was activated and the temperature held at 45°C. When the pH had been reduced to a value of 5.70 after 90 minutes, the pH was held at a value of between 5.70 and 5.72 with the aid of a pH adjusting means by pumping milk in the bottom part of the fermenting tank. The volumetric rate of flow amounted to 24 l/h. An equal amount of pre-fermented milk flowed simultaneously through the overflow 9 out of the tank and through a cooler, where the temperature was reduced to 37°C, to the rapidly rotating distributing device which had been positioned in its lowest position.

The coagulating tank was made of stainless steel and had been constructed with double walls. The internal diameter amounted to 35.7 cm, and the height to 80 cm. In the lower portion of said tank was mounted a stirring means, comprising a circular plate of stainless steel provided with perforations of 0.25 cm diameter at a mutual distance from one another, which distance was 1.5 cm. This plate was adapted be moved in an upward and downward direction over a distance of 10 cm with the aid of a lever mechanism. The space under said plate was previously filled with stirred yogurt. The stirring plate and the walls of the tank were treated with commercial soy bean lecithin. Subsequently the distributing device was raised at the same rate of speed as the rate of speed at which the liquid level rose in the container. From the very moment at which the acidity of the yogurt, just above the stirring plate, had reached a value of 90° N, the drawing off process was started with a volumetric rate of speed of 24 l/h. For this purpose the stirring plate was raised at a rate of speed of 3 cm/s and was subsequently lowered again in 25 minutes. The stirred yogurt was pumped out of the tank with the aid of a metering pump, the pump operating synchronously with the milk pump. In two hours' time the acidity of the yogurt flowing out of the tank showed valves between 85° and 95°N, while the viscosity, measured with the Posthumus cup (Off. Org. FNZ 46, 55 (1954)) varied between 30 and 45 seconds at 20°C. The quality of the yogurt was excellent.

EXAMPLE II.

A Bulgarian yogurt was prepared, starting with conventional yogurt milk, from which ⅓ of the volume was removed by evaporation. The procedure set forth in example I was repeated in full, on the understanding that the pH value at which evaporated milk began to be pumped into the tank amounted to 5.8, and the acidity at which the yogurt began to be pumped out of the tank amounted to 100°N.

EXAMPLE III.

Using the same apparatus as is used in example I, cultured buttermilk was prepared for which partly skimmed milk containing 0.4% by weight of fat was used, having a temperature of 30°C, which temperature was also maintained in the fermenting tank. After this tank had been filled, the milk was inoculated with 1½% of a BD starter. After 225 minutes a pH value had been reached of 5.35. Then the preformed milk was pumped into the fermenting tank, during which process the pre-fermented milk was not allowed to cool. Subsequently milk was pumped into the tank at a rate of speed amounting to 8 l/h. The space under the stirring plate of the coagulating tank was in this case filled with buttermilk. Inasmuch as the thickness of the layer of liquid in the tank only amounted to 12 cm because of the size of the volumetric flow (8 l/h) and the fermentation rate of speed (from 40°N to 85°N in 90 minutes), the distance over which the stirring plate was displaced was reduced to 1 to 2 cm. During 90 minutes there was thus obtained a cultured buttermilk having a most satisfactory structure, the acidity of which appeared to be 85°N continually.

EXAMPLE IV.

A starter was prepared in a manner corresponding with the manner described in example III, except for the fact that a fermenting temperature was used of 25°C, while furthermore the starting material used as skimmed milk containing 0.1% by weight of fat. The final product thus obtained was used to be added as a starter to cheese milk. No deviations of the normal procedure were observed in the preparation of cheese, while the cheese thus obtained had a satisfactory quality.

TABLE A

| | Solids non-fat content 8% | | | Inoculation 2½% (v/v) | |
| --- | --- | --- | --- | --- | --- |
| incubation temperature (°C) | incubation period prior to agitating (minutes) | acidity (°N) | (pH) | after complete incubation appearance | viscosity (s) |
| | 80 | 25.4 | 5.98 | satisfactory | 25 |
| | 90 | 28.7 | 5.81 | satisfactory | 25 |
| | 95 | 30.8 | 5.70 | satisfactory | 26 |
| | 100 | 32.0 | 5.08 | satisfactory | 26 |
| | 105 | 34.9 | 5.55 | some whey | 20 |
| 45 | 110 | 38.0 | 5.35 | a lot of whey | 8 |
| | 120 | 46.8 | 5.17 | a lot of whey | 10 |
| | 140 | 60.9 | 4.89 | whey | 12 |
| | 160 | 71.0 | 4.71 | some whey | 18 |
| | 180 | 75.0 | 4.61 | satisfactory | 18 |

Dependence of structure in the final product on disturbance at various acidity during fermentation of normal yogurt.

TABLE B

| Solids-non-fat content 8% B-starter | | Fat content 0.4% | | Inoculation-1½% (v/v) |
|---|---|---|---|---|
| Incubation temperature (°C) | incubation period prior to agitating (minutes) | Acidity (°N) | (pH) | appearance after complete incubation |
| 30 | 155 | 28 | 5.99 | satisfactory |
|  | 175 | 32 | 5.81 | satisfactory |
|  | 195 | 35 | 5.67 | satisfactory |
|  | 225 | 44 | 5.35 | satisfactory |
|  | 255 | 58 | 5.07 | very much whey |
|  | 285 | 72 | 4.90 | some whey |

Dependence of structure in the final product on disturbance at various acidity during fermentation of cultured buttermilk.

TABLE C

| Solids non-fat content 13.6% | | | | Inoculation 2½% (v/v) | |
|---|---|---|---|---|---|
| Incubation temperature (°C) | Incubation period prior to agitating | Acidity (°N) | (pH) | After complete appearance | incubation viscosity (s) |
| 40 | 90 | 30 | 6.19 | satisfactory | 74 |
|  | 100 | 31 | 6.17 | satisfactory | 73 |
|  | 110 | 34 | 6.07 | satisfactory | 67 |
|  | 125 | 37 | 6.04 | satisfactory | 69 |
|  | 145 | 41 | 5.86 | satisfactory | 72 |
|  | 180 | 67 | 5.24 | some whey | 59 |
|  | 210 | 93 | 4.95 | some whey | 55 |
| 37 | 115 | 29 | 6.21 | satisfactory | 68 |
|  | 125 | 31 | 6.20 | satisfactory | 72 |
|  | 140 | 32 | 6.15 | satisfactory | 69 |
|  | 155 | 36 | 6.09 | satisfactory | 70 |
|  | 170 | 41 | 5.94 | satisfactory | 75 |
|  | 185 | 45 | 5.78 | satisfactory | 72 |
|  | 215 | 60 | 5.36 | some whey | 52 |
|  | 245 | 82 | 5.14 | some whey | 54 |
|  | 260 | 87 | 5.00 | some whey | 49 |
| 34 | 135 | 29 | 6.29 | satisfactory | 77 |
|  | 160 | 31 | 6.23 | satisfactory | 80 |
|  | 175 | 33 | 6.15 | satisfactory | 88 |
|  | 205 | 38.5 | 6.08 | satisfactory | 85 |
|  | 220 | 43 | 6.00 | satisfactory | 87 |
|  | 235 | 45 | 5.84 | satisfactory | 82 |
|  | 250 | 48 | 5.70 | satisfactory | 89 |
|  | 280 | 67 | 5.34 | some whey | 70 |
|  | 295 | 80 | 5.20 | some whey | 69 |

Dependence of structure in the final produce on disturbance at various acidity during fermentation of Bulgarian yogurt.

TABLE D

| temperature (°C) | speed along the wall (cm/minute) | range start finish (°N) | final acidity (°N) | appearance | viscosity (g) |
|---|---|---|---|---|---|
| 37 | 5 | 33–39 | 81 | fair | 32 |
| 36 | 5 | 37–44 | 81 | fair | 29 |
| 35 | 5 | 38–44 | 80 | satisfactory | 56 |
| 34 | 5 | 42–48 | 83 | satisfactory | 49 |
| 34.6 | 10 | 44–47 | 96 | curdled | 37 |
| 37 | 4 | 42–52 | 85 | fair | |

Feasible rate of yogurt movement along the wall of the coagulation tank during the critical state of fermentation.

TABLE E

| pressure (kgf/cm²) | time of outflow (s) | viscosity (Posthumus cup) (s) | appearance (scale 3–8) | diameter perforations (cm) |
|---|---|---|---|---|
| 0.5 | 4.0 | 17 | 4 | |
| 0.44 | 3.4 | 14 | 6– | |
| 0.375 | 3.7 | 30 | 6– | 1.0 |
| 0.275 | 5.0 | 15 | 6– | |
| 0.05 | 17.2 | 22 | 5 | |
| 0.42 | 1.9 | 22 | 8– | |
| 0.37 | 2.3 | 16 | 7 | |

TABLE E-continued

| pressure (kgf/cm²) | time of outflow (s) | viscosity (Posthumus cup) (s) | appearance (scale 3-8) | diameter perforations (cm) |
| --- | --- | --- | --- | --- |
| 0.40 | 2.2 | 23 | 7+ | 0.36 |
| 0.30 | 3.0 | 27 | 7+ | |
| 0.20 | 4.1 | 28 | 7 | |
| 0.20 | 4.0 | 35 | 7 | |
| 0.10 | 4.3 | 20 | 6– | |
| 0.08 | 7.0 | 31 | 5 | |
| 0.04 | 6.3 | 38 | 4 | |
| 0.02 | 15.8 | 46 | 4 | |
| 0.20 | 2.2 | 23 | 8– | |
| 0.15 | 3.5 | 19 | 8– | |
| 0.12 | 3.8 | 35 | 8– | |
| 0.06 | 4.1 | 27 | 7+ | 0.25 |
| 0.02 | 5.6 | 33 | 6+ | |
| 0.00 | 14.0 | 23 | 4 | |
| 0.30 | 4.1 | 12 | 7.5 | |
| 0.27 | 5.3 | 15 | 7– | |
| 0.20 | 6.5 | 19 | 7+ | |
| 0.14 | 7.2 | 19 | 7 | 0.15 |
| 0.08 | 8.8 | 19 | 6 | |
| 0.05 | 10.5 | 19 | 5 | |
| 0.02 | 17.0 | 19 | 6 | |
| 0.10 | 1.5 | 23 | 8 | |
| 0.08 | 1.8 | 30 | 7 | |
| 0.05 | 3.0 | 25 | 7½ | 0.25 |
| 0.03 | 5.4 | 65 | 6 | |
| 0.02 | 9.7 | 27 | 5 | |

Effect of shearing on quality of yogurt (for description of experiments with apparatus of FIG. 5, vide text).

What is claimed is:

1. An apparatus for the continuous preparation of yoghurt comprising a pre-fermenting tank, means for adding milk to a fermenting mixture of milk and starter in said pre-fermenting tank, a coagulation tank having an inlet end and an outlet end, means for transferring the fermenting mixture from said prefermenting tank into said coagulating tank in which further fermentation and coagulation take place, means for cooling the fermenting mixture during passage into said coagulating tank, means positioned at said inlet end of said coagulating tank for distributing the fermenting mixture into said coagulating tank, means for generating shear forces positioned near said outlet end of said coagulating tank, said shear forces generating means including a preforated plate and means for translating said performated plate longitudinally relative to said coagulating tank, and means positioned downstream of said shear forces generating means at the outlet end of said coagulating tank for discharging the resulting product.

2. The apparatus of claim 1 in which said translating means moves said perforated plate parallel to the axial direction of said coagulating tank.

3. The apparatus of claim 1 in which said perforated plate is substantially flat and has substantially the same diameter as the inside of said coagulating tank.

4. The apparatus of claim 3 and further comprising sliding seal means for sealing said perforated plate to the inside of said coagulating tank.

5. The apparatus of claim 1 in which the perforations in said perforated plate are evenly distributed over the entire surface of said perforated plate.

6. The apparatus of claim 5 in which the area formed by said performations comprises at most 20% of the entire area of said perforated plate.

7. The apparatus of claim 1 in which said translation means moves said perforated plate upstream toward said inlet end of said coagulting tank at a speed of at least 1 cm/sec.

8. The apparatus of claim 1 in which said translation means moves said perforated plate downstream toward said outlet end of said coagulating tank at a speed of at most 5 cm/min.

9. The apparatus of claim 1 in which said means positioned downstream of said shear forces generating means for discharging the resulting product comprises a discharge pipe.

10. The apparatus of claim 1 in which said distributing means includes rotatable disc means adapted to being rotated at high speed to atomize the fermenting mixture.

11. An apparatus for the continuous preparation of yoghurt comprising a pre-fermenting tank, means for adding milk to a fermenting mixture of milk and starter in said pre-fermenting tank, a coagulation tank having an inlet end and an outlet end, means for transferring the fermenting mixture from said pre-fermenting tank into said coagulating tank in which further fermentation and coagulation take place, means for cooling the fermenting mixture during passage into said coagulating tank, means positioned at said inlet end of said coagulating tank for distributing the fermenting mixture into said coagulating tank, said distributing means including disc means and means for rotating said disc means at high speed to atomize the fermenting mixture, means for generating shear forces positioned near said outlet end of said coagulating tank, and means positioned downstream of said shear forces generating means at the outlet end of said coagulating tank for discharging the resulting product.

12. The apparatus of claim 11 and further comprising means for translating said distributing means longitudinally relative to said coagulating tank.

13. The apparatus of claim 11 in which said shear forces generating means includes a perforated plate adapted to be translated longitudinally relative to said coagulating tank.

14. The apparatus of claim 11 in which said means positioned downstream of said shear forces generating means for discharging the resulting product comprises a discharge pipe.

15. The apparatus of claim 11 in which the inlet end of said coagulating tank is positioned vertically above the outlet end of said coagulating tank.

16. An apparatus for the continuous preparation of yoghurt comprising a pre-fermenting tank, means for adding milk to a fermenting mixture of milk and starter in said pre-fermenting tank, a coagulation tank having an inlet end and an outlet end, means for transferring the fermenting mixture from said pre-fermenting tank into said coagulating tank in which further fermentation and coagulation take place, means for cooling the fermenting mixture during passage into said coagulating tank, means positioned at said inlet end of said coagulating tank for distributing the fermenting mixture into said coagulating tank, means for generating shear forces positioned near said outlet end of said coagulating tank, said shear forces generating means including a mobile plate having perforations evenly distributed over its entire surface the area of which amounts to at most 20% of the entire area of the plate, and discharge pipe means downstream of said shear forces generating means at said outlet of said coagulating tank for discharging the resulting product.

17. An apparatus for the continuous preparation of yoghurt comprising a pre-fermenting tank, means for adding milk to a fermenting mixture of milk and starter in said pre-fermenting tank, a coagulation tank having an inlet end and an outlet end, means for transferring the fermenting mixture from said pre-fermenting tank into said coagulating tank in which further fermentation and coagulation take place, means for cooling the fermenting mixture during passage into said coagulating tank, means positioned at said inlet end of said coagulating tank for spraying the fermenting mixture into said coagulating tank whereby the fermenting mixture flows through said coagulating and coagulates and forms a gel structure, means for stirring the gel structure near said outlet end of said coagulating tank to form a smooth consistency and discharge pipe means downstream of said stirring means at said outlet of said coagulating tank for filling containers with the resulting product.

18. The apparatus of claim 17 in which said stirring means comprises a perforated plate and means for moving said plate toward the inlet end of said coagulating tank while allowing the gel structure to pass downward through the perforations in said perforated plate.

* * * * *

UNITED STATES PATENT OFFICE
CERTIFICATE OF CORRECTION

PATENT NO. : 3,946,657
DATED : March 30, 1976
INVENTOR(S) : Fransiscus M. Driessen, Jacobus J. Stadhouders and Jacob Ubbels It is certified that error appears in the above-identified patent and that said Letters Patent are hereby corrected as shown below:

Page 1, Column 1, change the first name in the Assignee to --Stichting--.

Signed and Sealed this

Twenty-third Day of November 1976

[SEAL]

Attest:

RUTH C. MASON
Attesting Officer

C. MARSHALL DANN
Commissioner of Patents and Trademarks